US012794629B2

(12) United States Patent
Yuan et al.

(10) Patent No.: US 12,794,629 B2
(45) Date of Patent: Nov. 10, 2026

(54) METHOD, USER EQUIPMENT, AND APPARATUS FOR DOWNLINK CONTROL INFORMATION ALIGNMENT FOR MULTI-PANEL UPLINK MULTIPLE-INPUT MULTIPLE-OUTPUT TRANSMISSION

(71) Applicant: QUALCOMM Incorporated, San Diego, CA (US)

(72) Inventors: Fang Yuan, Beijing (CN); Wooseok Nam, San Diego, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 572 days.

(21) Appl. No.: 17/758,195

(22) PCT Filed: Jan. 29, 2020

(86) PCT No.: PCT/CN2020/074065
§ 371 (c)(1),
(2) Date: Jun. 29, 2022

(87) PCT Pub. No.: WO2021/151226
PCT Pub. Date: Aug. 5, 2021

(65) Prior Publication Data
US 2023/0026606 A1 Jan. 26, 2023

(51) Int. Cl.
*H04L 5/00* (2006.01)
*H04W 72/23* (2023.01)

(52) U.S. Cl.
CPC .......... *H04L 5/0051* (2013.01); *H04W 72/23* (2023.01)

(58) Field of Classification Search
CPC ... H04L 5/0051; H04L 5/0023; H04L 5/0053; H04W 72/23; H04B 7/0404; H04B 7/0691
See application file for complete search history.

(56) References Cited

U.S. PATENT DOCUMENTS 9,596,065 B2 3/2017 Chen et al.
10,425,825 B2 9/2019 Yang et al.
(Continued)

FOREIGN PATENT DOCUMENTS

CN 109565840 A 4/2019
CN 110168947 A 8/2019
(Continued)

OTHER PUBLICATIONS

Machine-translated English version of WO 2012092721 A1 retrieved from PE2E on Apr. 5, 2025 (Year: 2012).*
(Continued)

*Primary Examiner* — Jay L Vogel
*Assistant Examiner* — Adam Joel Cerlanek
(74) *Attorney, Agent, or Firm* — Harrity & Harrity, LLP

(57) ABSTRACT

Various aspects of the present disclosure generally relate to wireless communication. In some aspects, a user equipment may determine a first configuration for a first sounding reference signal (SRS) set and a second configuration for a second SRS set, the first SRS set to be transmitted using a first group of antennas of the UE and the second SRS set to be transmitted using a second group of antennas of the UE; determine a size of a downlink control information (DCI) field to be included in an uplink DCI communication scheduling a physical uplink shared channel (PUSCH) transmission, the DCI field to indicate a selected SRS set; receive the uplink DCI communication scheduling the PUSCH transmission; and identify the selected SRS set based at least in
(Continued)

| Tx Configuration | 2Tx | L = 1, N = 2 | L = 2, N = 2 |
|---|---|---|---|
| 4Tx | SRI size | 1 | 2 |
| L = 1, N = 3 | 2 | 1 | 0 |
| L = 2, N = 3 | 3 | 2 | 1 |
| L = 3, N = 3 | 3 | 2 | 1 |
| L = 1, N = 4 | 2 | 1 | 0 |
| L = 2, N = 4 | 4 | 3 | 2 |
| L = 3, N = 4 | 4 | 3 | 2 |
| L = 4, N = 4 | 4 | 3 | 2 |

Padding bits

L = Lmax, N = Nsrs part on the determined size of the DCI field and information carried in the DCI field. Numerous other aspects are provided.

30 Claims, 6 Drawing Sheets

(56) References Cited

U.S. PATENT DOCUMENTS

| | | | | |
|---|---|---|---|---|
| 2013/0215838 | A1 | 8/2013 | Aiba et al. | |
| 2019/0174527 | A1 | 6/2019 | Park et al. | |
| 2019/0200380 | A1* | 6/2019 | Park | H04L 27/2602 |
| 2020/0120584 | A1* | 4/2020 | Yi | H04B 7/06968 |
| 2022/0322239 | A1* | 10/2022 | Huang | H04B 7/0639 |

FOREIGN PATENT DOCUMENTS

| | | | | |
|---|---|---|---|---|
| WO | WO-2012092721 A1 * | 7/2012 | H04L 5/0091 |
| WO | WO-2014065850 | 5/2014 | |
| WO | 2018231141 A1 | 12/2018 | |

OTHER PUBLICATIONS

Machine-translated English version of WO-2012092721-A1retreived from PE2E on Apr. 5, 2025 (Year: 2012).*

Supplementary European Search Report—EP20916588—Search Authority—The Hague—Sep. 6, 2023.

ZTE: "Full TX Power UL Transmission", 3GPP TSG RAN WG1 Meeting #98, R1-1908193, 3rd Generation Partnership Project (3GPP), Mobile Competence Centre, 650, Route Des Lucioles, F-06921, Sophia-Antipolis Cedex, France, vol. RAN WG1, No. Prague, CZ, Aug. 27, 2019-Aug. 30, 2019, Aug. 17, 2019, 16 Pages, XP051764812, Sec.2.2.2.

International Search Report and Written Opinion—PCT/CN2020/074065—ISA/EPO—Oct. 27, 2020.

Nokia, et al., "Enhancements on Multi-Beam Operation", 3GPP Draft, 3GPP TSG RAN WG1 #97 Meeting, R1-1907317, 3rd Generation Partnership Project (3GPP), Mobile Competence Centre, 650, Route Des Lucioles, F-06921, Sophia-Antipolis Cedex France, vol. RAN WG1, No. Reno, Nevada, USA, May 13, 2019-May 17, 2019, May 13, 2019 (May 13, 2019), XP051728756, 22 Pages, Retrieved from the Internet: URL: http://www.3gpp.org/ftp/Meetings%5F3GPP%5FSYNC/RAN1/Docs/R1%2D1907317%2Ezip [retrieved on May 13, 2019] sections 2 and 3, paragraph [0002], the whole document.

ZTE: "Full TX Power UL transmission", 3GPP TSG RAN WG1 #98bis, R1-1910286, Chongqing, China, Oct. 14-18, 2019, 10 Pages.

* cited by examiner

| Tx Configuration | 2Tx | L = 1, N = 2 | L = 2, N = 2 |
|---|---|---|---|
| 4Tx | SRI size | 1 | 2 |
| L = 1, N = 3 | 2 | 1 | 0 |
| L = 2, N = 3 | 3 | 2 | 1 |
| L = 3, N = 3 | 3 | 2 | 1 |
| L = 1, N = 4 | 2 | 1 | 0 |
| L = 2, N = 4 | 4 | 3 | 2 |
| L = 3, N = 4 | 4 | 3 | 2 |
| L = 4, N = 4 | 4 | 3 | 2 |

Padding bits

L = Lmax, N = Nsrs

FIG. 3B

| Tx Configuration | 2Tx | R = 1, FPN | R = 1, PN | R = 2, FPN | R = 2, N |
|---|---|---|---|---|---|
| 4Tx | TPMI size | 3 | 1 | 4 | 2 |
| R = 1, FPN | 5 | **2** | **4** | **1** | **3** |
| R = 2, 3, 4, FPN | 6 | **3** | **5** | **2** | **4** |
| R = 1, PN | 4 | **1** | **3** | **0** | **2** |
| R = 2, 3, 4, PN | 5 | **2** | **4** | **1** | **3** |
| R = 1, N | 2 | **-1** | **1** | **-2** | **0** |
| R = 2, 3, 4, N | 4 | **1** | **3** | **0** | **2** |

Padding bits

R = maxRank, F = full-coherent, P = partial-coherent, N = non-coherent

FIG. 3C

METHOD, USER EQUIPMENT, AND APPARATUS FOR DOWNLINK CONTROL INFORMATION ALIGNMENT FOR MULTI-PANEL UPLINK MULTIPLE-INPUT MULTIPLE-OUTPUT TRANSMISSION

CROSS-REFERENCE TO RELATED APPLICATION

This application is a 371 national stage of PCT Application No. PCT/CN2020/074065 filed on Jan. 29, 2020, entitled "DOWNLINK CONTROL INFORMATION ALIGNMENT FOR MULTI-PANEL UPLINK MULTIPLE-INPUT MULTIPLE-OUTPUT TRANSMISSION," which is hereby expressly incorporated by reference herein.

FIELD OF THE DISCLOSURE

Aspects of the present disclosure generally relate to wireless communication and to techniques and apparatuses for downlink control information (DCI) alignment for multi-panel uplink multiple-input multiple-output (MIMO) transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include determining a first configuration for a first sounding reference signal (SRS) set and a second configuration for a second SRS set, the first SRS set to be transmitted using a first group of antennas of the UE and the second SRS set to be transmitted using a second group of antennas of the UE; determining, based at least in part on the first configuration and the second configuration, a size of a downlink control information (DCI) field to be included in an uplink DCI communication scheduling a physical uplink shared channel (PUSCH) transmission, the DCI field to indicate a selected SRS set; receiving the uplink DCI communication scheduling the PUSCH transmission; and identifying the selected SRS set based at least in part on the determined size of the DCI field and information carried in the DCI field, the selected SRS set being either the first SRS set or the second SRS set.

In some aspects, a UE for wireless communication may include a memory and one or more processors operatively coupled to the memory. The memory and the one or more processors may be configured to determine a first configuration for a first SRS set and a second configuration for a second SRS set, the first SRS set to be transmitted using a first group of antennas of the UE and the second SRS set to be transmitted using a second group of antennas of the UE; determine, based at least in part on the first configuration and the second configuration, a size of a DCI field to be included in an uplink DCI communication scheduling a PUSCH transmission, the DCI field to indicate a selected SRS set; receive the uplink DCI communication scheduling the PUSCH transmission; and identify the selected SRS set based at least in part on the determined size of the DCI field and information carried in the DCI field, the selected SRS set being either the first SRS set or the second SRS set.

In some aspects, a non-transitory computer-readable medium may store one or more instructions for wireless communication. The one or more instructions, when executed by one or more processors of a UE, may cause the one or more processors to determine a first configuration for a first SRS set and a second configuration for a second SRS set, the first SRS set to be transmitted using a first group of antennas of the UE and the second SRS set to be transmitted using a second group of antennas of the UE; determine, based at least in part on the first configuration and the second configuration, a size of a DCI field to be included in an uplink DCI communication scheduling a PUSCH transmission, the DCI field to indicate a selected SRS set; receive the uplink DCI communication scheduling the PUSCH transmission; and identify the selected SRS set based at least in part on the determined size of the DCI field and information carried in the DCI field, the selected SRS set being either the first SRS set or the second SRS set.

In some aspects, an apparatus for wireless communication may include means for determining a first configuration for a first SRS set and a second configuration for a second SRS set, the first SRS set to be transmitted using a first group of antennas of the apparatus and the second SRS set to be transmitted using a second group of antennas of the apparatus; means for determining, based at least in part on the first configuration and the second configuration, a size of a DCI field to be included in an uplink DCI communication scheduling a PUSCH transmission, the DCI field to indicate a selected SRS set; means for receiving the uplink DCI communication scheduling the PUSCH transmission; and means for identifying the selected SRS set based at least in part on the determined size of the DCI field and information carried in the DCI field, the selected SRS set being either the first SRS set or the second SRS set.

Aspects generally include a method, apparatus, system, computer program product, non-transitory computer-readable medium, user equipment, base station, wireless communication device, and/or processing system as substantially described herein with reference to and as illustrated by the accompanying drawings, appendix, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples associated with DCI alignment for a multi-panel uplink MIMO transmission, in accordance with various aspects of the present disclosure.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
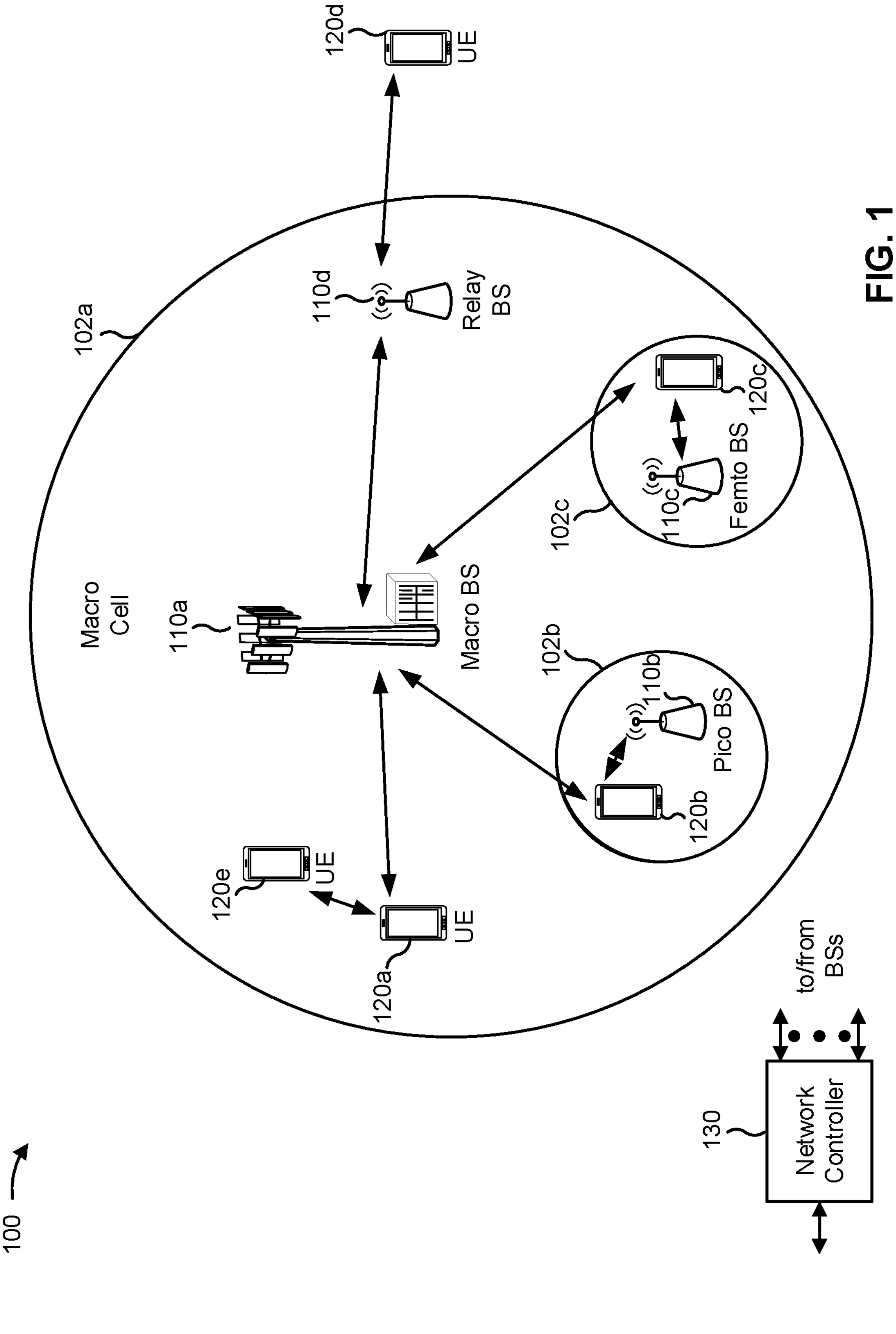
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
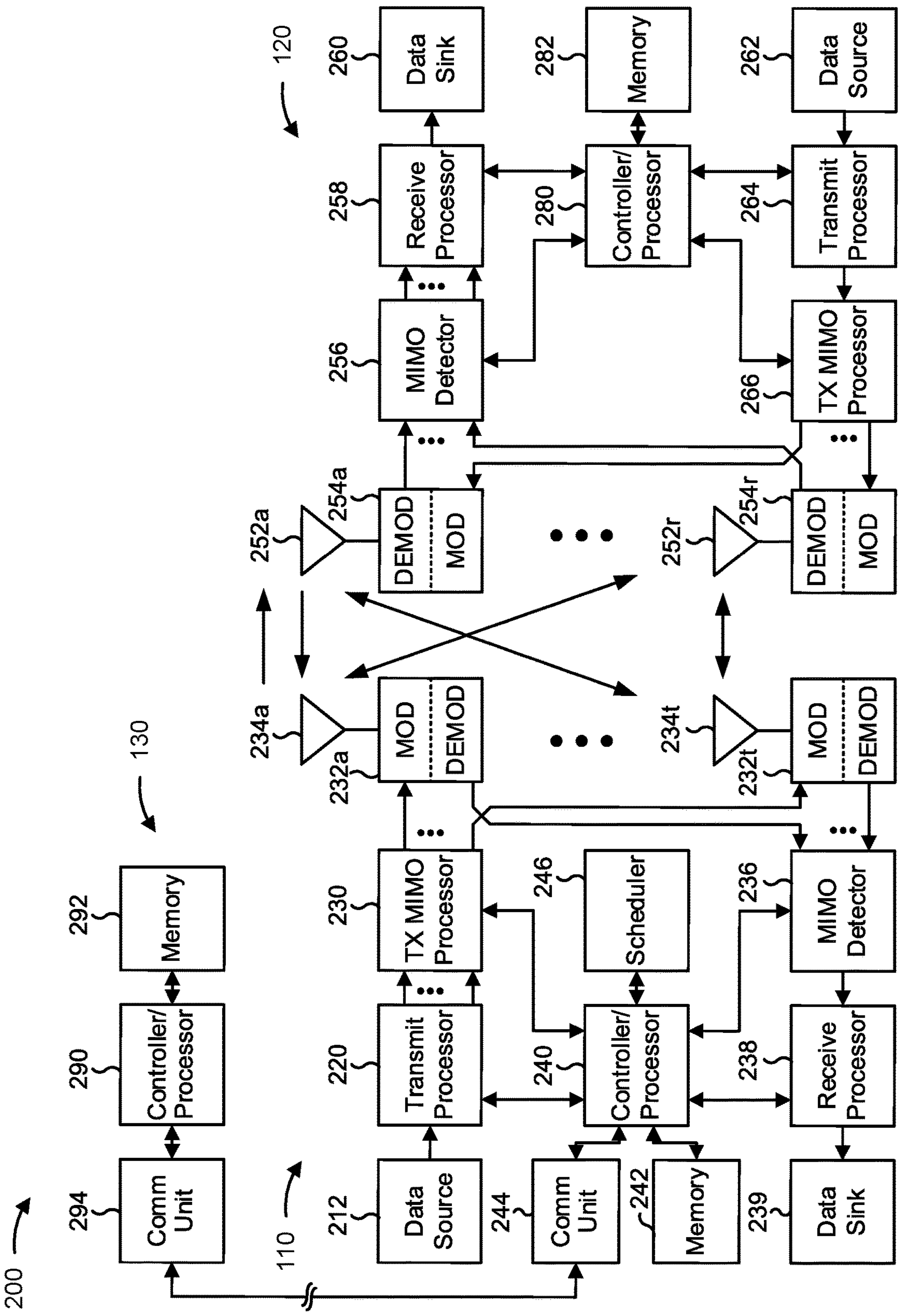
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with DCI alignment for a multi-panel uplink MIMO transmission, as described in more detail elsewhere herein. For example, controller/processor 240 of base station 110, controller/processor 280 of UE 120, and/or any other component(s) of FIG. 2 may perform or direct operations of, for example, process 400 of FIG. 4, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, and/or other processes as described herein. A scheduler 246 may schedule UEs for data transmission on the downlink and/or uplink.

In some aspects, UE 120 may include means for determining a first configuration for a first SRS set and a second configuration for a second SRS set, the first SRS set to be transmitted using a first group of antennas of UE 120 and the second SRS set to be transmitted using a second group of antennas of UE 120; means for determining, based at least in part on the first configuration and the second configuration, a size of a DCI field to be included in an uplink DCI communication scheduling a PUSCH transmission, the DCI field to indicate a selected SRS set; means for receiving the uplink DCI communication scheduling the PUSCH transmission; means for identifying the selected SRS set based at least in part on the determined size of the DCI field and information carried in the DCI field, the selected SRS set being either the first SRS set or the second SRS set; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

A UE (e.g., a UE 120) may, in some cases, have two heterogeneous groups of antennas (also sometimes referred to as panels), meaning that the UE may include multiple groups of antennas that have a different number of antenna ports. For example, a UE with two heterogenous groups of antennas may include a first group of antennas with four antenna ports and a second group of antennas with two antenna ports. Such a UE may be useful, for example, to reduce a cost of the UE (e.g., since increasing a number of antenna ports increases a cost of the UE), to reduce an area requirement for UE antenna groups (e.g., such that space can be conserved for use by another component of the UE, such as a camera array), and/or the like. In the case of a UE having multiple groups of antennas, a given uplink downlink control information (DCI) communication can schedule any group of antennas for an uplink transmission (e.g., an uplink MIMO transmission).

However, in the case of a UE having heterogenous groups of antennas (i.e., panels with different numbers of antenna ports), a size of one or more fields of the uplink DCI communication may differ in length (i.e., use a different number of bits) depending on which group of antennas the uplink DCI communication is scheduling. For example, a UE may have a first group of antennas including four antenna ports and second group of antennas including two antenna ports. Here, an uplink DCI communication scheduling an uplink transmission that is to use the first group of antennas may include a field that indicates a selected sounding reference signal (SRS) set as an SRS set transmitted using the first group of antennas, and the size of the DCI field may be, for example, four bits. Conversely, an uplink DCI communication scheduling an uplink transmission that is to use the second group of antennas may include a field that indicates a selected SRS set as an SRS set transmitted using the second group of antennas, and the size of the DCI field may be, for example, two bits. It is possible that the UE may perform blind detection of the DCI with various lengths to determine which group of antennas is being scheduled by the uplink DCI. However, such a technique increases complexity and/or power consumption at the UE and, therefore, is not desirable.

Some aspects described herein provide techniques and apparatuses for DCI alignment for a multi-panel uplink MIMO transmission. In some aspects, a UE may determine configurations for first and second SRS sets, where the first SRS set is to be transmitted using a first group of antennas and the second SRS set is to be transmitted using a second group of antennas. In some aspects, the UE may determine, based at least in part on the first and second configurations, a size of a DCI field to be included in an uplink DCI communication scheduling an uplink transmission, where the DCI field is to indicate a selected SRS set. Here, the UE may receive the uplink DCI communication scheduling the uplink transmission, and may identify the selected SRS set based at least in part on the determined size of the DCI field and information carried in the DCI field. Because the size of the DCI field is determined by the UE based at least in part on the first configuration and the second configuration, a potential DCI field size mismatch is avoided, thereby eliminating a need for the UE to perform blind decoding in association with identifying the selected SRS set. Additional details are provided below.

Figure 3A:
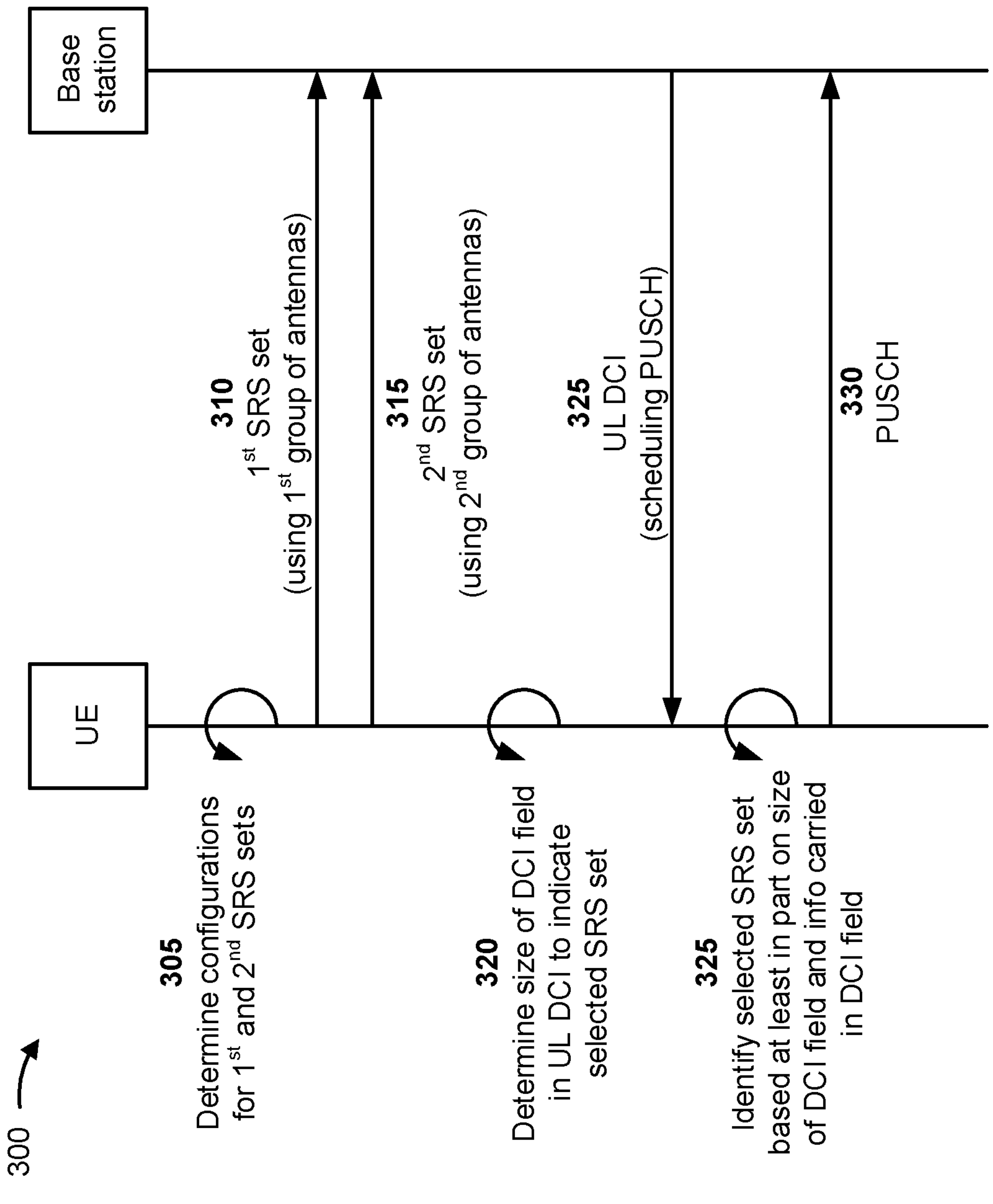

FIGS. 3A-3C are diagrams illustrating examples associated with DCI alignment for a multi-panel uplink MIMO transmission, in accordance with various aspects of the present disclosure. In the example shown in FIG. 3A, a UE (e.g., a UE 120) includes a first group of antennas and a second group of antennas, either of which may be scheduled to be used for an uplink transmission (e.g., a PUSCH transmission).

In some aspects, the UE may be configured for non-codebook-based PUSCH transmissions, and usage of SRS sets may be configured as non-codebook-based. Such a scenario is herein referred to as a non-codebook-based scenario. Alternatively, in some aspects, the UE may configured for codebook-based PUSCH transmissions, and usage of SRS sets may be configured as codebook-based. Such a scenario is herein referred to as a codebook-based scenario. Examples associated with non-codebook-based and codebook-based scenarios are described below.

As shown by reference 305, the UE may determine a first configuration for a first SRS set and a second configuration for a second SRS set. In some aspects, the first SRS set is an SRS set that is to be transmitted using the first group of antennas of the UE and the second SRS set is an SRS set that is to be transmitted using a second group of antennas of the UE.

In some aspects, in a non-codebook-based scenario, the first configuration may include information that identifies a number of SRSs in the first SRS set (Nsrs1) and a maximum number of layers associated with the first SRS set (Lmax1). Similarly, the second configuration may include information that identifies a number of SRSs in the second SRS set (Nsrs2) and a maximum number of layers associated with the second SRS set (Lmax2).

In some aspects, in a codebook-based scenario, the first configuration may include information that identifies a number of ports of the first SRS set, a value of maximum rank parameter associated with the first SRS set (maxRank), and a setting of a codebook subset parameter associated with the first SRS set (e.g., an indication of whether the codebook subset parameter is set to fullyAndPartialAndNonCoherent, partialAndNonCoherent, or nonCoherent). Similarly, the second configuration includes information that identifies a number of ports of the second SRS set, a value of a maximum rank parameter associated with the second SRS set, and a setting of a codebook subset parameter associated with the second SRS set.

In some aspects, the first configuration and/or the second configuration may be based at least in part on a UE capability. For example, in a non-codebook-based scenario, the first configuration and/or the second configuration may be based at least in part on a UE capability associated with a number of SRSs per group of antennas, a UE capability associated with a maximum number of SRS resources that can be configured to the UE for simultaneous transmission in a same symbol, a UE capability associated with a maximum number of SRS resources, and/or the like. In some aspects, the UE may provide one or more reports associated with such UE capabilities. Here, a base station (e.g., a base station 110) may receive the one or more reports, may determine the first configuration and/or the second configuration based at least in part on the one or more reported UE capabilities, and may signal the first configuration and/or the second configuration to the UE (e.g., via radio resource control (RRC) signaling).

In some aspects, in a non-codebook-based scenario, the first SRS set may have up to four SRSs and the second SRS set may have up to four SRSs (e.g., when the UE has two groups of antennas, each including four antenna ports). Alternatively, in a non-codebook-based scenario, the first SRS set may have up to four SRSs and the second SRS set may have up to two SRSs, in some aspects (e.g., when the UE has a first group of antennas including four antenna ports, and a second group of antennas including two antenna ports).

As another example, in a codebook-based scenario, the first configuration and/or the second configuration may be based at least in part on a UE capability associated with a number of ports per group of antennas of the UE, a UE capability associated with a codebook subset parameter, and/or the like. In some aspects, the UE may provide one or more reports associated with such UE capabilities. Here the base station may receive the one or more reports, may determine the first configuration and/or the second configuration based at least in part on the one or more reported UE capabilities, and may signal the first configuration and/or the second configuration to the UE (e.g., via RRC signaling).

In some aspects, in a codebook-based scenario, the first SRS set may have up to four ports and the second SRS set may have up to four ports (e.g., when the UE has two groups of antennas, each including four antenna ports). Alternatively, in a non-codebook-based scenario, the first SRS set may have up to four ports and the second SRS set may have up to two ports, in some aspects (e.g., when the UE has a first group of antennas including four antenna ports, and a second group of antennas including two antenna ports).

As shown by references 310 and 315, the UE may transmit the first SRS set and may transmit the second SRS set, respectively. In some aspects, the UE may transmit the first SRS set using the first group of antennas and based at least in part on the first configuration. Similarly, the UE may transmit the second SRS set using the second group of antennas and based at least in part on the second configuration.

As shown by reference 320, the UE may determine a size of a DCI field, associated with indicating a selected SRS set, to be included in an uplink DCI communication scheduling an uplink transmission (e.g., a PUSCH transmission). In some aspects, the UE may determine the size of the DCI field based at least in part on the first configuration and the second configuration.

For example, in a non-codebook-based scenario, a first configuration may configure a first SRS set including four SRSs (Nsrs1=4) with a maximum of four layers (Lmax1=4), while a second configuration may configure a second SRS including two SRSs (Nsrs2=2) with a maximum of two layers (Lmax2=2). Here, the UE may determine (e.g., based at least in part on a table identifying sizes of SRS resource indicator (SRI) fields for non-codebook-based PUSCH transmissions with a maximum of four layers) that a size of an SRI field related to the first configuration is four bits. The UE may also determine (e.g., based at least in part on a table identifying sizes of SRI fields for non-codebook-based PUSCH transmissions with a maximum of two layers) that a size of an SRI field related to the second configuration is two bits. Here, the UE may determine the size of the DCI field, associated with indicating the selected SRS, to be four bits (e.g., the larger of the two SRI field sizes). In some aspects, the UE may identify the selected set of SRSs based at least in part on the determined size of the DCI field, as described below.

Additionally, or alternatively, in a non-codebook-based scenario, the size of the DCI may be determined by evaluating the following formula:

$$DCI \text{ size} = \log_2\left(\sum_{k=1}^{\min\{\max\{Lmax1, Lmax2\}, \max\{Nsrs1, Nsrs2\}\}} \binom{\max\{Nsrs1, Nsrs2\}}{k}\right)$$

As another example, in a codebook-based scenario, a first configuration may configure a first SRS set with a transform precoder disabled and including four ports with a maximum rank parameter of four (maxRank=4) and a codebook subset parameter setting of ‘fullyAndPartialAndNoncoherent,’ while a second configuration may configure a second SRS with a transform precoder disabled and including two ports with a maximum rank parameter of two (maxRank=2) and codebook subset parameter setting of ‘fullyAndPartialAndNoncoherent.’ Here, the UE may determine (e.g., based at least in part on a table identifying sizes of transmit precoder matrix indicator (TPMI)/transmit rank indicator (TRI) fields for codebook-based PUSCH transmissions with a four antenna ports and a maxRank of 2, 3, or 4) that a size of a TPMI field related to the first configuration is six bits. The UE may also determine (e.g., based at least in part on a table identifying sizes of TPMI/TRI fields for codebook-based PUSCH transmissions with two antenna ports and a maxRank of 2 s) that a size of a TPMI field related to the second configuration is four bits. Here, the UE may determine the size of the DCI field, associated with indicating the selected SRS, to be six bits (e.g., the larger of the two TPMI field sizes). In some aspects, the UE may identify the selected set of SRSs based at least in part on the determined size of the DCI field, as described below.

As shown by reference 325, the UE may receive the uplink DCI communication scheduling the PUSCH transmission. For example, the base station may receive the first SRS set and the second SRS set transmitted by the UE. The base station may measure the first SRS set and the second SRS set and, based at least in part on the measurements, may identify an SRS set that used a group of antennas suitable for transmission of the uplink transmission. The base station may then provide the uplink DCI communication that indicates the selected SRS and schedules the uplink transmission. In some aspects, the base station may determine the size of the DCI field, associated with indicated the selected SRS set, in a manner similar to that of the UE, as described above. In some aspects, the base station may include one or more padding bits in the DCI field associated with indicating the selected SRS set, as described below. The UE may receive the uplink DCI communication from the base station, accordingly.

As shown by reference 325, the UE may identify the selected SRS set based at least in part on the determined size of the DCI field and information carried in the DCI field, the selected SRS set being either the first SRS set or the second SRS set.

For example, in the above example for a non-codebook-based scenario, the UE determined that a size of the DCI field is to be four bits (e.g., based at least in part on determining that a size of an SRI field related to the first configuration is four bits and that a size of an SRI field related to the second configuration is two bits). In this example, the UE may receive the uplink DCI communication and process the DCI field, associated with indicating the selected SRS set, to determine whether the DCI field includes two padding bits (e.g., whether the two most significant bits (MSB) of the DCI field carrying the SRI include a particular sequence, such as 0 0). Here, the UE may identify that the selected SRS set as the second SRS set when the DCI field includes two padding bits (e.g., since only two of the four bits are needed to convey an indication associated with the second SRS set). Conversely, the UE may identify the selected SRS set as the first SRS set when the DCI field does not include any padding bits (e.g., since four bits are needed convey an indication associated with the first SRS set). Thus, in some aspects, in a non-codebook-based scenario, the DCI field may include an SRI field that indicates a precoder for the uplink transmission and a number of layers associated with the uplink transmission, and a length of the SRI field may serve as an indicator of the selected SRS set. In this way, the DCI field may include one or more padding bits associated with avoiding a DCI size mismatch in a non-codebook-based scenario.

FIG. 3B is a table illustrating examples of a number of padding bits that may be included in the DCI field, associated with indicating the selected SRS set, in various non-codebook-based scenarios when the UE has a first group of four antennas and a second group of two antennas.

As another example, in the above example for a codebook-based scenario, the UE determined that a size of the DCI field is to be six bits (e.g., based at least in part on determining that a size of a TPMI/TRI field related to the first configuration is six bits and that a size of a TPMI/TRI field related to the second configuration is four bits). In this example, the UE may receive the uplink DCI communication and process the DCI field, associated with indicating the selected SRS set, to determine whether the DCI field includes two padding bits. Here, the UE may identify the selected SRS set as the second SRS set when the DCI field includes two padding bits (e.g., since only four of the six bits are needed to convey an indication associated with the second SRS set). Conversely, the UE may identify the selected SRS set as the first SRS set when the DCI field does not include any padding bits (e.g., since six bits are needed convey an indication associated with the first SRS set). Thus, in some aspects, in a codebook-based scenario, the DCI field may include a TPMI/TRI field that indicates a precoder for the uplink transmission and a number of layers associated with the uplink transmission, and a length of the TPMI/TRI field may serve as an indicator of the selected SRS set. In this way, the DCI field may include one or more padding bits associated with avoiding a DCI size mismatch. In this way, the DCI field may include one or more padding bits associated with avoiding a DCI size mismatch in a codebook-based scenario.

FIG. 3C is a table illustrating examples of a number of padding bits that may be included in the DCI field, associated with indicating the selected SRS set, in various codebook-based scenarios when the UE has a first group of four antennas and a second group of two antennas.

Returning to FIG. 3A, in some aspects, as shown by reference 330, the UE may transmit the uplink transmission based at least in part on the identified selected SRS set. For example, the UE may identify the selected SRS set based at least in part on the uplink DCI communication, and may transmit the uplink transmission based at least in part on the selected SRS set, accordingly. As a particular example, the UE may transmit the uplink transmission using the first group of antennas when the first SRS set is the selected SRS set, and may transmit the uplink transmission using the second group of antennas when the second SRS set is the selected SRS set.

As indicated above, FIGS. 3A-3C are provided as examples. Other examples may differ from what is described with respect to FIGS. 3A-3C.

Figure 4:
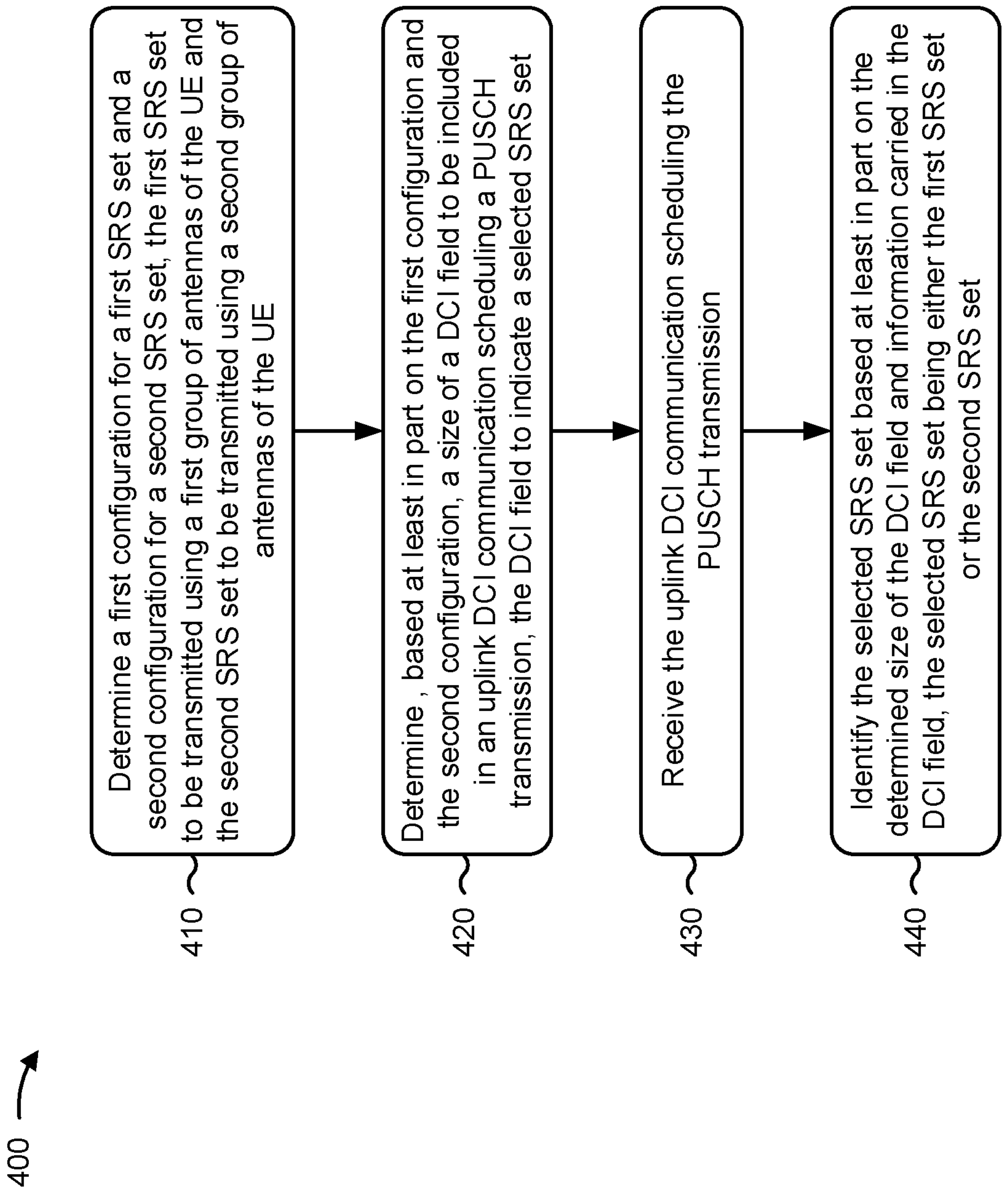
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with DCI alignment for a multi-panel uplink MIMO transmission.

As shown in FIG. 4, in some aspects, process 400 may include determining a first configuration for a first SRS set and a second configuration for a second SRS set, the first SRS set to be transmitted using a first group of antennas of the UE and the second SRS set to be transmitted using a second group of antennas of the UE (block 410). For example, the UE (e.g., using receive processor 258, transmit processor 264, controller/processor 280, memory 282, and/or the like) may determine a first configuration for a first SRS set and a second configuration for a second SRS set, as described above. In some aspects, the first SRS set is to be transmitted using a first group of antennas of the UE and the second SRS set to be transmitted using a second group of antennas of the UE.

As further shown in FIG. 4, in some aspects, process 400 may include determining, based at least in part on the first configuration and the second configuration, a size of a DCI field to be included in an uplink DCI communication scheduling a PUSCH transmission, the DCI field to indicate a selected SRS set (block 420). For example, the UE (e.g., using receive processor 258, transmit processor 264, controller/processor 280, memory 282, and/or the like) may determine, based at least in part on the first configuration and the second configuration, a size of a DCI field to be included in an uplink DCI communication scheduling a PUSCH transmission, as described above. In some aspects, the DCI field is to indicated a selected SRS set.

As further shown in FIG. 4, in some aspects, process 400 may include receiving the uplink DCI communication scheduling the PUSCH transmission (block 430). For example, the UE (e.g., using receive processor 258, controller/processor 280, memory 282, and/or the like) may receive the uplink DCI communication scheduling the PUSCH transmission, as described above.

As further shown in FIG. 4, in some aspects, process 400 may include identifying the selected SRS set based at least in part on the determined size of the DCI field and information carried in the DCI field, the selected SRS set being either the first SRS set or the second SRS set (block 440). For example, the UE (e.g., using receive processor 258, transmit processor 264, controller/processor 280, memory 282, and/or the like) may identify the selected SRS set based at least in part on the determined size of the DCI field and information carried in the DCI field, as described above. In some aspects, the selected SRS set is either the first SRS set or the second SRS set.

Process 400 may include additional aspects, such as any single aspect or any combination of aspects described below and/or in connection with one or more other processes described elsewhere herein.

In a first aspect, process 400 includes transmitting the PUSCH transmission based at least in part on the identified selected SRS set, wherein the PUSCH transmission is transmitted using the first group of antennas when the first SRS set is the selected SRS set, and wherein the PUSCH transmission is transmitted using the second group of antennas when the second SRS set is the selected SRS set.

In a second aspect, alone or in combination with the first aspect, process 400 includes transmitting the first SRS set using the first group of antennas and based at least in part on the first configuration; and transmitting the second SRS set using the second group of antennas and based at least in part on the second configuration.

In a third aspect, alone or in combination with one or more of the first and second aspects, the DCI field includes one or more padding bits associated with avoiding a DCI size mismatch.

In a fourth aspect, alone or in combination with one or more of the first through third aspects, the UE is configured for non-codebook-based PUSCH transmissions, and usage of the first and second SRS sets is configured as non-codebook-based.

In a fifth aspect, alone or in combination with one or more of the first through fourth aspects, the first SRS set has up to four SRSs, and the second SRS set has up to four SRSs.

In a sixth aspect, alone or in combination with one or more of the first through fifth aspects, the first SRS set has up to four SRSs, and the second SRS set has up to two SRSs.

In a seventh aspect, alone or in combination with one or more of the first through sixth aspects, process 400 includes providing a report including UE capability information associated with a number of SRSs per group of antennas of the UE, wherein the first configuration and the second configuration are based at least in part on the UE capability information associated with the number of SRSs per group of antennas.

In an eighth aspect, alone or in combination with one or more of the first through seventh aspects, the first configuration includes information that identifies a number of SRSs in the first SRS set and a maximum number of layers associated with the first SRS set, and the second configuration includes information that identifies a number of SRSs in the second SRS set and a maximum number of layers associated with the second SRS set.

In a ninth aspect, alone or in combination with one or more of the first through eighth aspects, process 400 includes providing a report including UE capability information associated with a maximum number of SRS resources that can be configured to the UE for simultaneous transmission in a same symbol and a maximum number of SRS resources, wherein the first configuration and the second configuration are based at least in part on the UE capability information.

In a tenth aspect, alone or in combination with one or more of the first through ninth aspects, the DCI field includes an SRS resource indicator that indicates a precoder for the PUSCH transmission and a number of layers associated with the PUSCH transmission.

In an eleventh aspect, alone or in combination with one or more of the first through tenth aspects, the UE is configured for codebook-based PUSCH transmissions, and usage of the first and second SRS sets is configured as codebook-based.

In a twelfth aspect, alone or in combination with one or more of the first through eleventh aspects, the first SRS set has up to four ports, and the second SRS set has up to four ports.

In a thirteenth aspect, alone or in combination with one or more of the first through twelfth aspects, the first SRS set has up to four ports, and the second SRS set has up to two ports.

In a fourteenth aspect, alone or in combination with one or more of the first through thirteenth aspects, process 400 includes providing a report including UE capability information associated with a number of ports per group of antennas of the UE, wherein the first configuration and the second configuration are based at least in part on the UE capability information associated with the number of ports per group of antennas.

In a fifteenth aspect, alone or in combination with one or more of the first through fourteenth aspects, the first configuration includes information that identifies a number of ports of the first SRS set, a value of maximum rank parameter associated with the first SRS set, and a setting of a codebook subset parameter associated with the first SRS set, and the second configuration includes information that identifies a number of ports of the second SRS set, a value of a maximum rank parameter associated with the second SRS set, and a setting of a codebook subset parameter associated with the second SRS set.

In a sixteenth aspect, alone or in combination with one or more of the first through fifteenth aspects, process 400 includes providing a report including UE capability information associated with a codebook subset parameter, wherein the first configuration and the second configuration are based at least in part on the UE capability information associated with the codebook subset parameter.

In a seventeenth aspect, alone or in combination with one or more of the first through sixteenth aspects, the DCI field includes a transmit precoder matrix indicator that indicates a precoder for the PUSCH transmission and a transmit rank indicator that indicates a number of layers associated with the PUSCH transmission.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

determining, based at least in part on a UE capability associated with a number of ports per panel of the UE, a first configuration for a first sounding reference signal (SRS) set and a second configuration for a second SRS set, the first SRS set to be transmitted using a first panel of the UE and the second SRS set to be transmitted using a second panel of the UE, the first configuration including information that identifies a first number of SRSs in the first SRS set and a first maximum number of layers associated with the first panel, and the second configuration includes information that identifies a second number of SRSs in the second SRS set and a second maximum number of layers associated with the second panel;

determining, based at least in part on the first configuration and the second configuration, a size of a downlink control information (DCI) field to be included in an uplink DCI communication scheduling a physical uplink shared channel (PUSCH) transmission, the DCI field to indicate a selected SRS set;

receiving the uplink DCI communication scheduling the PUSCH transmission; and identifying the selected SRS set based at least in part on the determined size of the DCI field and information carried in the DCI field, the selected SRS set being either the first SRS set or the second SRS set.

2. The method of claim 1, further comprising:

transmitting the PUSCH transmission based at least in part on the identified selected SRS set, wherein the PUSCH transmission is transmitted using the first panel when the first SRS set is the selected SRS set, and wherein the PUSCH transmission is transmitted using the second panel when the second SRS set is the selected SRS set.

3. The method of claim 1, further comprising:

transmitting the first SRS set using the first panel and based at least in part on the first configuration; and transmitting the second SRS set using the second panel and based at least in part on the second configuration.

4. The method of claim 1, wherein the UE is configured for non-codebook-based PUSCH transmissions, and usage of the first and second SRS sets is configured as non-codebook-based.

5. The method of claim 1, wherein the first SRS set has up to four SRSs, and the second SRS set has up to four SRSs.

6. The method of claim 1, wherein the first SRS set has up to four SRSs, and the second SRS set has up to two SRSs.

7. The method of claim 1, further comprising:

providing a report including UE capability information associated with a number of SRSs per panel of the UE, wherein the first configuration and the second configuration are based at least in part on the UE capability information associated with the number of SRSs per panel.

8. The method of claim 1, further comprising:

providing a report including UE capability information associated with a maximum number of SRS resources that can be configured to the UE for simultaneous transmission in a same symbol and a maximum number of SRS resources, wherein the first configuration and the second configuration are based at least in part on the UE capability information.

9. The method of claim 1, wherein the DCI field includes an SRS resource indicator that indicates a precoder for the PUSCH transmission and a number of layers associated with the PUSCH transmission.

10. The method of claim 1, wherein the UE is configured for codebook-based PUSCH transmissions, and usage of the first and second SRS sets is configured as codebook-based.

11. The method of claim 1, wherein the first SRS set has up to four ports, and the second SRS set has up to four ports.

12. The method of claim 1, wherein the first SRS set has up to four ports, and the second SRS set has up to two ports.

13. The method of claim 1, further comprising:

providing a report including UE capability information associated with the number of ports per panel of the UE.

14. The method of claim 1, wherein:

the first configuration includes information that identifies a number of ports of the first SRS set, a value of maximum rank parameter associated with the first SRS set, and a setting of a codebook subset parameter associated with the first SRS set, and the second configuration includes information that identifies a number of ports of the second SRS set, a value of a maximum rank parameter associated with the second SRS set, and a setting of a codebook subset parameter associated with the second SRS set.

15. The method of claim 1, further comprising:

providing a report including UE capability information associated with a codebook subset parameter, wherein the first configuration and the second configuration are based at least in part on the UE capability information associated with the codebook subset parameter.

16. The method of claim 1, wherein the DCI field includes a transmit precoder matrix indicator that indicates a precoder for the PUSCH transmission and a transmit rank indicator that indicates a number of layers associated with the PUSCH transmission.

17. A user equipment (UE) for wireless communication, comprising:

one or more memories; and one or more processors coupled with the one or more memories and configured to cause the UE to:

determine, based at least in part on a UE capability associated with a number of ports per panel of the UE, a first configuration for a first sounding reference signal (SRS) set and a second configuration for a second SRS set, the first SRS set to be transmitted using a first panel of the UE and the second SRS set to be transmitted using a second panel of the UE, the first configuration including information that identifies a first number of SRSs in the first SRS set and a first maximum number of layers associated with the first panel, and the second configuration includes information that identifies a second number of SRSs in the second SRS set and a second maximum number of layers associated with the second panel;

determine, based at least in part on the first configuration and the second configuration, a size of a downlink control information (DCI) field to be included in an uplink DCI communication scheduling a physical uplink shared channel (PUSCH) transmission, the size of the DCI field being determined based at least in part on evaluation of a formula that computes the size of the DCI field as a function of a minimum of a first value and a second value, the first value comprising a maximum of the first maximum number of layers and the second maximum number of layers, the second value comprising a maximum of the first number of SRSs and the second number of SRSs, and the DCI field to indicate a selected SRS set;

receive the uplink DCI communication scheduling the PUSCH transmission; and identify the selected SRS set based at least in part on the determined size of the DCI field and information carried in the DCI field, the selected SRS set being either the first SRS set or the second SRS set.

18. An apparatus for wireless communication, comprising:

means for determining, based at least in part on a capability associated with a number of ports per panel of the apparatus, a first configuration for a first sounding reference signal (SRS) set and a second configuration for a second SRS set, the first SRS set to be transmitted using a first panel of the apparatus and the second SRS set to be transmitted using a second panel of the apparatus, the first configuration including information that identifies a first number of SRSs in the first SRS set and a first maximum number of layers associated with the first panel, and the second configuration includes information that identifies a second number of SRSs in the second SRS set and a second maximum number of layers associated with the second panel;

means for determining, based at least in part on the first configuration and the second configuration, a size of a downlink control information (DCI) field to be included in an uplink DCI communication scheduling a physical uplink shared channel (PUSCH) transmission, the DCI field to indicate a selected SRS set;

means for receiving the uplink DCI communication scheduling the PUSCH transmission; and means for identifying the selected SRS set based at least in part on the determined size of the DCI field and information carried in the DCI field, the selected SRS set being either the first SRS set or the second SRS set.

19. The UE of claim 17, wherein the one or more processors are further configured to cause the UE to:

transmit the PUSCH transmission based at least in part on the identified selected SRS set, wherein the PUSCH transmission is transmitted using the first panel when the first SRS set is the selected SRS set, and wherein the PUSCH transmission is transmitted using the second panel when the second SRS set is the selected SRS set.

20. The UE of claim 17, wherein the one or more processors are further configured to cause the UE to:

transmit the first SRS set using the first panel and based at least in part on the first configuration; and transmit the second SRS set using the second panel and based at least in part on the second configuration.

21. The UE of claim 17, wherein the UE is configured for non-codebook-based PUSCH transmissions, and usage of the first and second SRS sets is configured as non-codebook-based.

22. The UE of claim 17, wherein the first SRS set has up to four SRSs, and the second SRS set has up to four SRSs.

23. The UE of claim 17, wherein the first SRS set has up to four SRSs, and the second SRS set has up to two SRSs.

24. The UE of claim 17, wherein the one or more processors are further configured to cause the UE to:

provide a report including UE capability information associated with a number of SRSs per panel of the UE, wherein the first configuration and the second configuration are based at least in part on the UE capability information associated with the number of SRSs per panel.

25. The UE of claim 17, wherein the one or more processors are further configured to cause the UE to:

provide a report including UE capability information associated with a maximum number of SRS resources that can be configured to the UE for simultaneous transmission in a same symbol and a maximum number of SRS resources, wherein the first configuration and the second configuration are based at least in part on the UE capability information.

26. The UE of claim 17, wherein the DCI field includes an SRS resource indicator that indicates a precoder for the PUSCH transmission and a number of layers associated with the PUSCH transmission.

27. The method of claim 1, wherein identifying the selected SRS set comprises:

identifying the selected SRS set as the first SRS set when the DCI field does not include one or more padding bits, and identifying the selected SRS set as the second SRS set when the DCI field includes the one or more padding bits.

28. The UE of claim 17, wherein, to identify the selected SRS set, the one or more processors are configured to cause the UE to:

identify the selected SRS set as the first SRS set when the DCI field does not include one or more padding bits, and identify the selected SRS set as the second SRS set when the DCI field includes the one or more padding bits.

29. The UE of claim 17, wherein the UE is configured for codebook-based PUSCH transmissions, and usage of the first and second SRS sets is configured as codebook-based.

30. The apparatus of claim 18, wherein the means for identifying the selected SRS set comprise:

means for identifying the selected SRS set as the first SRS set when the DCI field does not include one or more padding bits, and means for identifying the selected SRS set as the second SRS set when the DCI field includes the one or more padding bits.

* * * * *